United States Patent
Iio et al.

(10) Patent No.: US 8,675,974 B2
(45) Date of Patent: Mar. 18, 2014

(54) IMAGE PROCESSING APPARATUS AND IMAGE PROCESSING METHOD

(75) Inventors: Yuichiro Iio, Kawasaki (JP); Shunta Tate, Tokyo (JP); Masakazu Matsugu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 368 days.

(21) Appl. No.: 12/972,322

(22) Filed: Dec. 17, 2010

(65) Prior Publication Data

US 2011/0158535 A1 Jun. 30, 2011

(30) Foreign Application Priority Data

Dec. 24, 2009 (JP) .................................. 2009-293205

(51) Int. Cl.
*G06K 9/62* (2006.01)
*G06K 9/46* (2006.01)

(52) U.S. Cl.
USPC ........................................... 382/225; 382/190

(58) Field of Classification Search
None
See application file for complete search history.

(56) References Cited

U.S. PATENT DOCUMENTS

| | | | |
|---|---|---|---|
| 6,345,119 B1 * | 2/2002 | Hotta et al. | ................... 382/225 |
| 7,039,233 B2 | 5/2006 | Mori et al. | |
| 7,054,850 B2 | 5/2006 | Matsugu | |
| 7,274,819 B2 | 9/2007 | Matsugu | |
| 7,577,297 B2 | 8/2009 | Mori et al. | |
| 7,734,067 B2 * | 6/2010 | Kim et al. | ..................... 382/115 |
| 7,881,524 B2 | 2/2011 | Matsugu et al. | |
| 7,912,253 B2 | 3/2011 | Suzuki et al. | |
| 2004/0096100 A1 * | 5/2004 | Ii et al. | ........................... 382/159 |
| 2005/0100243 A1 * | 5/2005 | Shum et al. | .................... 382/276 |
| 2006/0074653 A1 | 4/2006 | Mitari et al. | |
| 2006/0115157 A1 | 6/2006 | Mori et al. | |
| 2008/0219516 A1 | 9/2008 | Suzuki et al. | |
| 2009/0219405 A1 | 9/2009 | Kaneda et al. | |
| 2009/0324060 A1 | 12/2009 | Sato et al. | |
| 2010/0329556 A1 | 12/2010 | Mitarai et al. | |

FOREIGN PATENT DOCUMENTS

| | | |
|---|---|---|
| JP | 64-66699 | 3/1989 |
| JP | 07-262373 A | 10/1995 |
| JP | 11-203415 A | 7/1999 |

OTHER PUBLICATIONS

Fei-Fei, L., et al., "A Bayesian Hierarchical Model for Learning Natural Scene Categories", IEEE Comp. Visual Pattern Recognition, 2005.

Yankov, D., et al., "Manifold Clustering of Shapes", Proc. of ICDM, 2006.

Dorko, G., et al., "Object Class Recognition Using Discriminative Local Features", IEEE Transactions on Pattern Analysis and Machine Intelligence, 2004.

(Continued)

*Primary Examiner* — Barry Drennan
*Assistant Examiner* — David F Dunphy
(74) *Attorney, Agent, or Firm* — Fitzpatrick, Cella, Harper & Scinto

(57) ABSTRACT

A classification result is stored in advance. At the time of identification, classification is performed at a high speed based on the stored classification result. In pre-classification, classification is performed divisionally in two stages. In the first classification, a plurality of representative vectors are generated from the classification result using a fast executable method. In the second classification, the created representative vectors are classified, and the result is stored in a lookup table. When an identification target image is input, the classification result can be reflected at a high speed by using the lookup table.

14 Claims, 13 Drawing Sheets

(56) References Cited

OTHER PUBLICATIONS

Lowe, D., "Object Recognition from Local Scale-Invariant Features", Proc. of the International Conference on Computer Vision, Sep. 1999.

Bosch, A., et al., "Representing Shape with a Spatial Pyramid Kernel", in Proc. CIVR, 2007.

Tenenbaum, J.B., et al., "A Global Geometric Framework for Nonlinear Dimensionality Reduction", Science, vol. 290, Dec. 2000.

U.S. Appl. No. 12/876,974, filed Sep. 7, 2010, Applicant: Shunta Tate.

Japanese Office Action dated Aug. 2, 2013 corresponding to Japanese Patent Application No. 2009-293205.

* cited by examiner

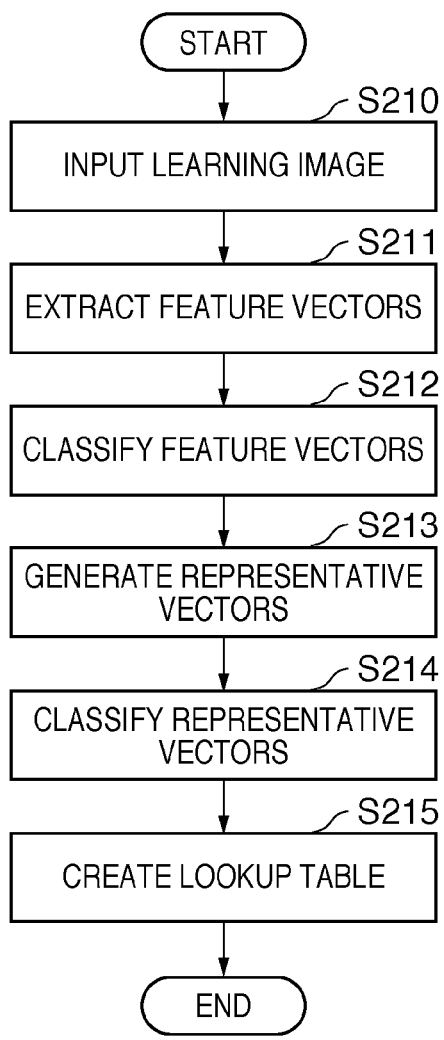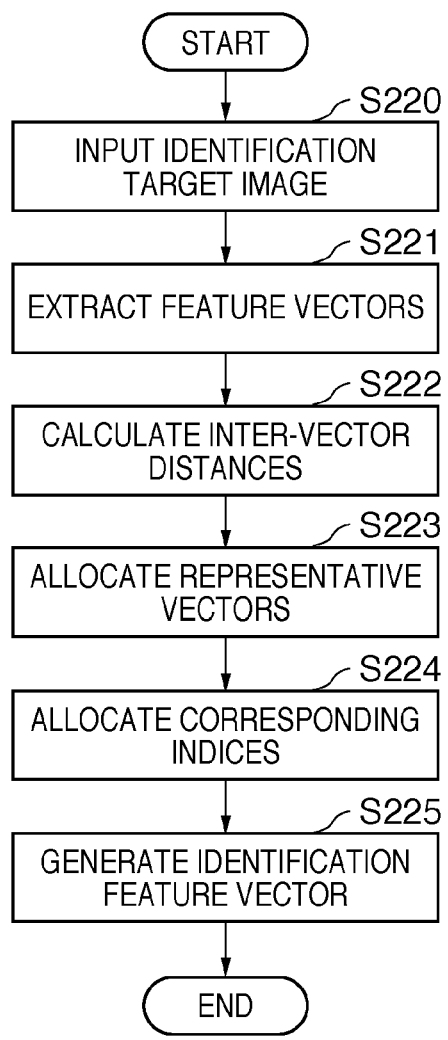

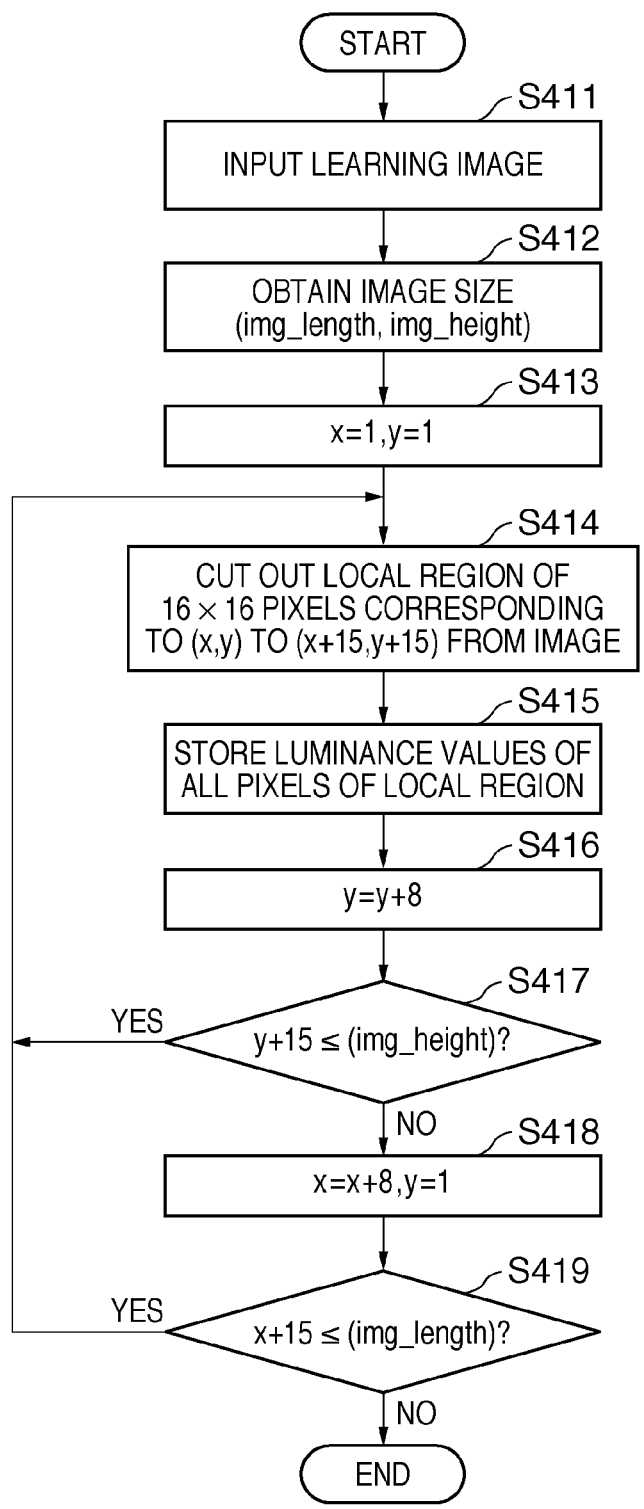

FEATURE VECTOR HAVING, AS ELEMENTS, LUMINANCE VALUES IN LOCAL REGION OF 16 × 16 PIXELS

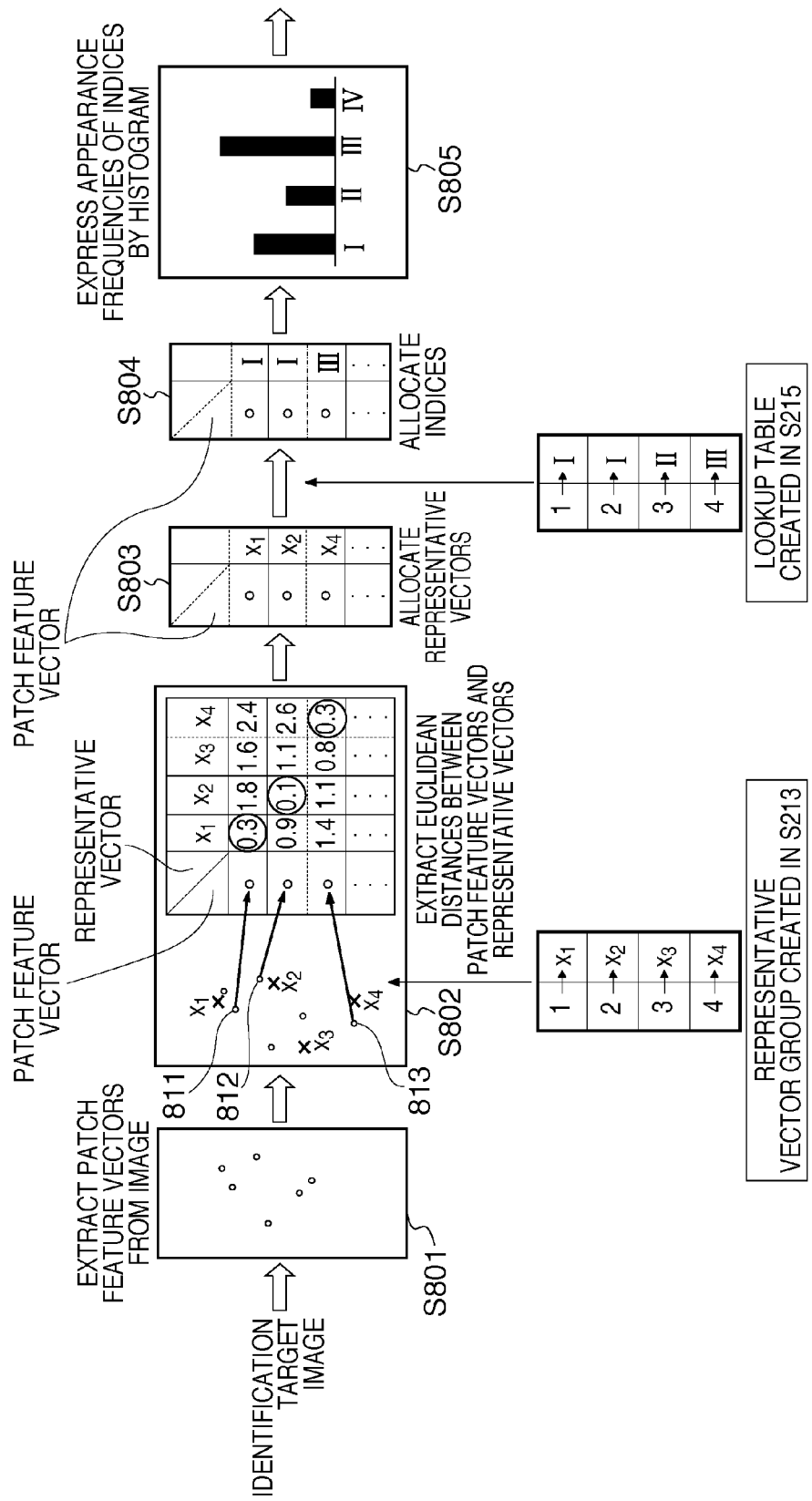

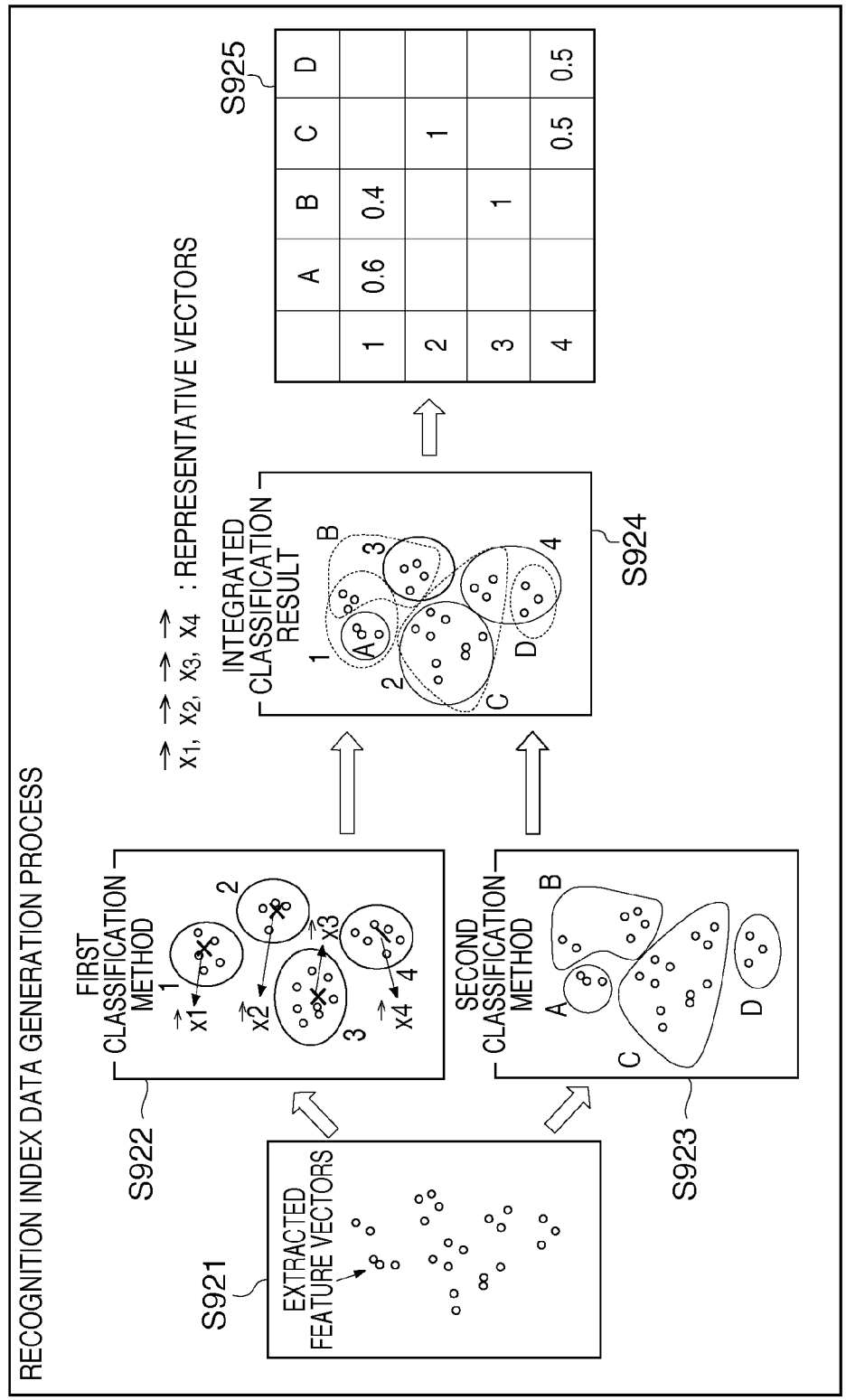

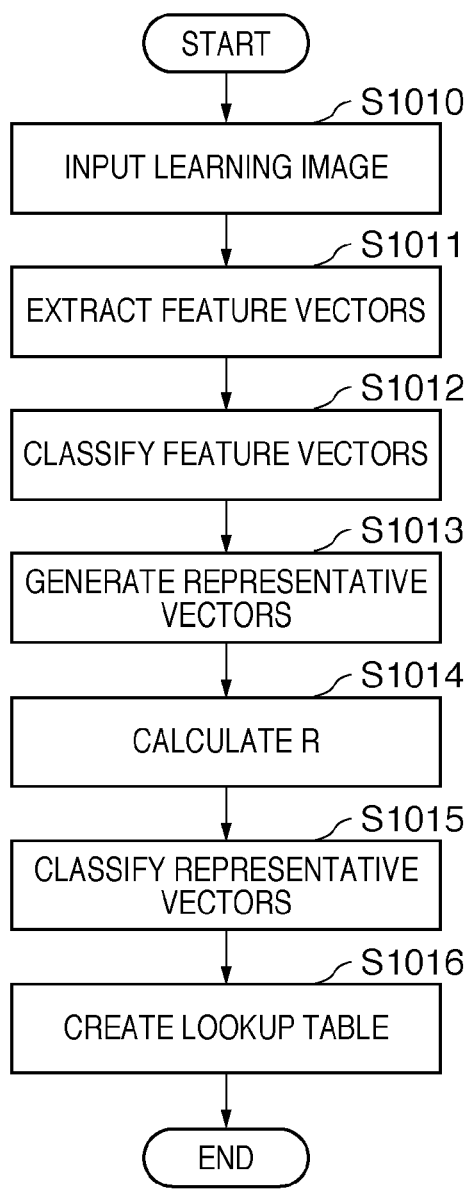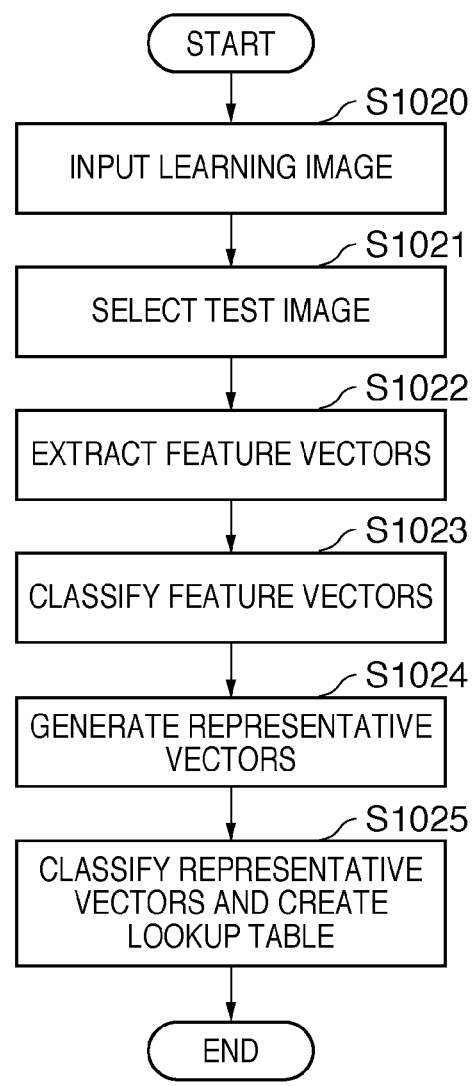

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

As a conventional method of identifying/detecting an image by allocating representative vectors prepared in advance to feature vectors obtained from the identification/detection target image, L. Fei-Fei and P. Perona, "A Bayesian Hierarchical Model for Learning Natural Scene Categories", IEEE Comp. Vis. Patt. Recog. 2005 (to be referred to as non-patent reference 1 hereinafter) is known. The method of non-patent reference 1 detects or identifies a target using a feature vector group extracted from an input image. Representative vectors are generated by clustering feature vectors that are extracted from learning data in advance. Identification is done by allocating feature vectors extracted from an identification target image to the indices of neighboring representative vectors.

In non-patent reference 1, the feature vector group extracted from the learning image is preprocessed and divided into a plurality of clusters. Representative vectors are calculated from a feature vector group included in each cluster, and a table storing the representative vectors is generated. In this method, however, feature vector classification greatly affects the identification performance. There have been studied various feature vector classification methods for higher performance, including manifold clustering described in D. Yankov and E Keogh, "Manifold clustering of shapes", Proc. of ICDM, 2006 (to be referred to as non-patent reference 2 hereinafter) and clustering using a mixed Gaussian distribution described in G. Dorko and C. Schmid, "Object Class Recognition Using Discriminative Local Features", IEEE TRANSACTIONS ON PATTERN ANALYSIS AND MACHINE INTELLIGENCE, 2004 (to be referred to as non-patent reference 3 hereinafter).

In addition, various examinations have been made to reduce the amount of representative vector calculation or the calculation amount in allocating indices representing representative vectors. In Japanese Patent Laid-Open No. 64-66699, when generating representative vectors, a lookup table for storing representative vector indices corresponding to all coordinates of an input vector space is created. The representative vector indices are allocated by looking up the lookup table, thereby reducing the calculation amount.

However, the methods of non-patent references 2 and 3 require a large calculation amount and also a long processing time for identification. That is, when allocating feature vectors to representative vectors or indices representing representative vectors, it is necessary to execute, even for the feature vectors, processing such as projection to a manifold or mixed Gaussian distribution, which is processing for representative vector generation, and calculate the distances between the feature vectors and the representative vectors. When the calculation amount needed for feature vector classification increases, the calculation amount needed when allocating the feature vectors extracted from an identification target image to representative vectors or indices representing representative vectors also increase, leading to difficulty in real-time identification.

The method of Japanese Patent Laid-Open No. 64-66699 assumes that the input vector space is finite, and distance calculation in representative vector allocation is performed using simple Euclidean distances. This method is therefore hard to implement for a complex method using manifold clustering or the like.

SUMMARY OF THE INVENTION

The present invention provides an image processing technique capable of suppressing the calculation amount when allocating feature vectors extracted from an identification target image to representative vectors or indices representing representative vectors even if the calculation amount for feature vector classification increases.

According to an aspect of the present invention, an embodiment is directed to an image processing apparatus for outputting identification information to identify an object from an identification target image, comprising:

a first feature vector extraction unit adapted to extract feature vectors from a learning image included in an image group to be used for learning;

a first feature vector classification unit adapted to classify the feature vectors extracted by the first feature vector extraction unit into a first set based on a first classification method;

a representative vector generation unit adapted to generate representative vectors of the feature vectors included in the first set classified by the first feature vector classification unit;

a representative vector classification unit adapted to classify the representative vectors generated by the representative vector generation unit into a second set based on a second classification method;

an association unit adapted to associate the representative vectors generated by the representative vector generation unit with the second set classified by the representative vector classification unit;

a second feature vector extraction unit adapted to extract feature vectors from the input identification target image;

a distance calculation unit adapted to calculate distances between the feature vectors extracted by the second feature vector extraction unit and the representative vectors generated by the representative vector generation unit;

a representative vector allocation unit adapted to allocate the representative vectors to the feature vectors extracted by the second feature vector extraction unit using the distances calculated by the distance calculation unit; and an index allocation unit adapted to allocate, to each feature vector using the association, an index to specify a cluster to which the representative vector allocated to the feature vector is classified.

According to another aspect of the present invention, an embodiment is directed to an image processing apparatus for outputting identification information to identify an object from an identification target image, comprising:

a first feature vector extraction unit adapted to extract feature vectors from a learning image included in an image group to be used for learning;

a first feature vector classification unit adapted to classify the feature vectors extracted by the first feature vector extraction unit into a first set based on a first classification method;

a representative vector generation unit adapted to generate representative vectors of the feature vectors included in the first set classified by the first feature vector classification unit;

a representative vector classification unit adapted to classify the representative vectors generated by the representative vector generation unit into a second set based on a second classification method;

an integration unit adapted to integrate representative vectors of similar shape out of the representative vectors classified by the representative vector classification unit; and an output unit adapted to output the identification information based on the feature vectors and the representative vectors integrated by the integration unit.

According to the present invention, it is possible to suppress the calculation amount when allocating feature vectors extracted from an identification target image to representative vectors or indices representing representative vectors even if the calculation amount for feature vector classification increases.

Further features of the present invention will become apparent from the following description of exemplary embodiments (with reference to the attached drawings).

BRIEF DESCRIPTION OF THE DRAWINGS

FIGS. 2A and 2B are flowcharts for explaining the procedure of processing of the image processing apparatus according to the first embodiment;

FIG. 4 is a flowchart for explaining the procedure of feature vector extraction processing according to the first embodiment;

FIG. 8 is a view schematically showing the procedure of a classification index allocation step according to the first embodiment;

FIG. 9B is a view schematically showing the processing procedure of the classification table generation step of the image processing apparatus according to the second embodiment;

FIG. 10A is a flowchart for explaining the processing procedure of the classification table generation step of an image processing apparatus according to the third embodiment;

FIG. 10B is a flowchart for explaining the processing procedure of the classification table generation step of an image processing apparatus according to the fourth embodiment.

DESCRIPTION OF THE EMBODIMENTS

Figure 1A:
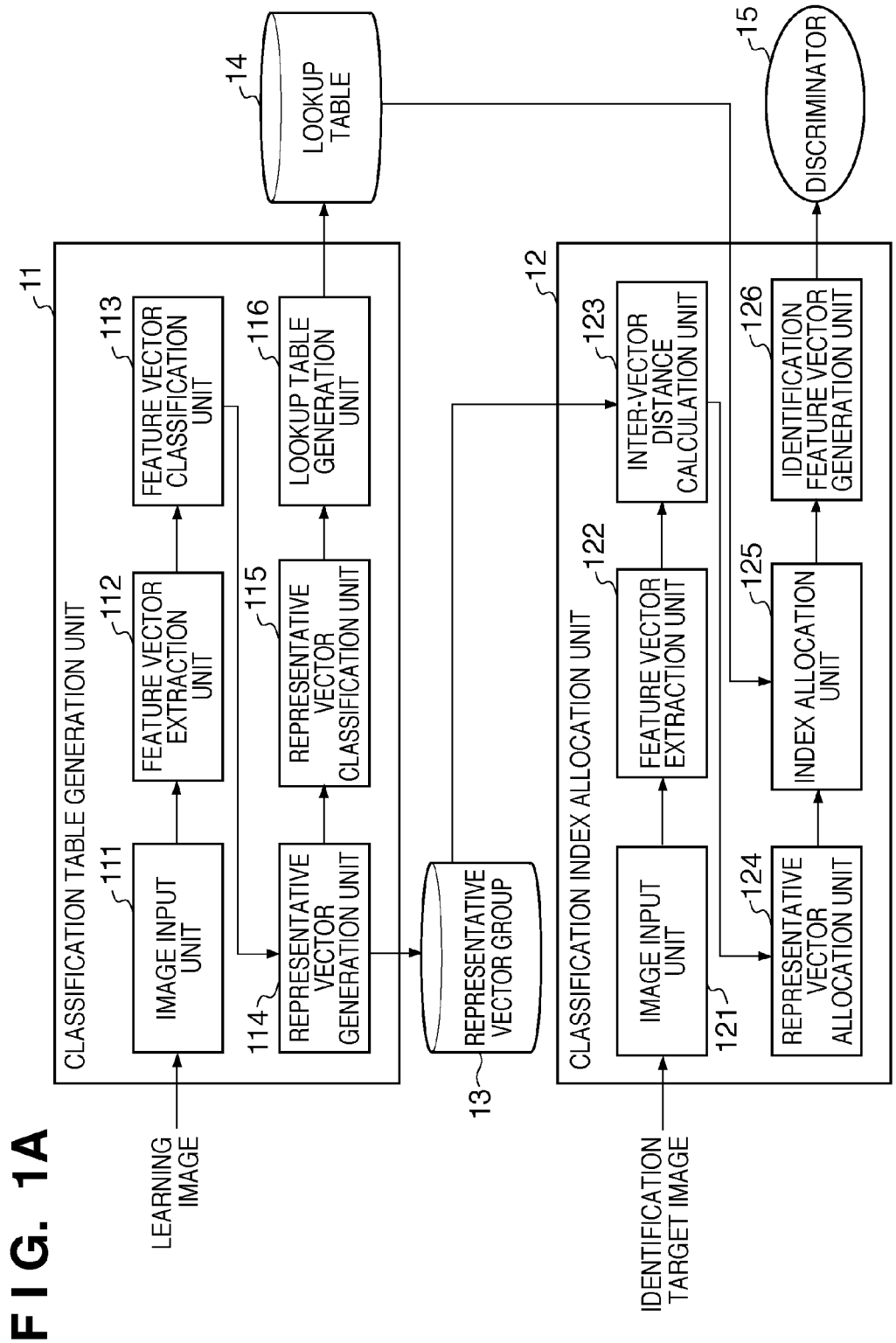
FIG. 1A is a block diagram for explaining the schematic arrangement of an image processing apparatus according to the first embodiment.

In the embodiments to be described below, learning is done in advance using an image group including an identification target, and an input image is identified. In the embodiments, the image group used for learning will be referred to as a "learning image", and the input image will be referred to as an "identification target image". "Identification" indicates determining whether the identification target image includes an identification target identical to the learning image. For example, when an identification target exists in an identification target image, it is determined that the identification target image includes the identification target identical to a learning image even if the identification target in the identification target image has a position, orientation, or background different from that of the learning image.

(First Embodiment)

In order to identify an object in an image, an image processing apparatus according to the embodiment outputs identification information to identify an object from an identification target image. Note that the embodiment is also applicable to an identification target such as a person or a scene, and is not limited to recognition of a target object.

The schematic arrangement of the image processing apparatus according to the first embodiment will be described with reference to FIG. 1A. The image processing apparatus includes a classification table generation unit 11 and a classification index allocation unit 12.

The outline of the classification table generation unit 11 and the classification index allocation unit 12 will be explained. The classification table generation unit 11 accepts input of a learning image from an external device and extracts feature vectors from the input learning image. The extracted feature vectors are classified by a first classification method to generate representative vectors. The generated representative vectors are classified by a second classification method to generate a lookup table 14 for storing index data of classification destinations. The first classification method can classify feature vectors faster than the second classification method.

On the other hand, the classification index allocation unit 12 accepts input of an identification target image from an external device and extracts feature vectors from the input identification target image. The distances between each extracted feature vector and all representative vectors generated by a representative vector generation unit 114 of the classification table generation unit 11 are calculated so as to obtain the nearest representative vector for each feature vector. Next, based on the lookup table 14 generated by a lookup table generation unit 116 of the classification table generation unit 11, index data corresponding to the obtained representative vector is allocated to each feature vector. Feature vectors to be supplied to a discriminator 15 are generated using the index data.

(Arrangement of Classification Table Generation Unit 11)

The detailed arrangement of the classification table generation unit 11 will be described next. An image input unit 111 of the classification table generation unit 11 accepts input of an image group transmitted from the external device and to be used for learning, and outputs the image group to a feature vector extraction unit 112.

The feature vector extraction unit 112 (first feature vector extraction unit) extracts feature vectors from the input image group. The feature vectors to be extracted at this time can be arbitrary feature vectors. Examples are an SIFT feature vector (Lowe, D. G.: Object recognition from local scale-invariant features, Proc. of IEEE ICCV, pp. 628-641, 1998) and a PHOG feature vector (A. Bosch, A. Zisserman, and X. Munoz. Representing shape with a spatial pyramid kernel. In Proc. CIVR, 2007.)

A feature vector classification unit 113 classifies the feature vectors extracted by the feature vector extraction unit 112 into a plurality of clusters (first sets) based on the first classification method. Note that though the first classification method used by the feature vector classification unit 113 can be an arbitrary classification method, the classification method can give prominence to the execution speed because it is used in index allocation processing. Examples are the k-means method and the Nearest Neighbor method (see Chapter 1 of Aso, Tsuda, and Murata, "Statistics of Pattern Recognition and Learning", Iwanami Shoten).

The representative vector generation unit 114 generates representative vectors of the feature vectors included in each cluster in accordance with the classification result of the feature vector classification unit 113, and stores the generated representative vector group (to also be simply referred to as representative vectors hereinafter) in a storage device 13. The storage device 13 for storing representative vectors stores the representative vectors and their indices.

A representative vector classification unit 115 receives the representative vectors generated by the representative vector generation unit 114 and classifies them into a plurality of clusters (second sets). Though the second classification method used by the representative vector classification unit 115 can be an arbitrary classification method, the classification method is different from that of the feature vector classification unit 113, and is a high-performance classification method that reflects the characteristic of an image. Since this classification is done only for the representative vectors generated by the representative vector generation unit 114, the number of target data can be decreased, and the processing time necessary for the classification can also shorten even if the classification method requires a large calculation amount. Note that the representative vector of each cluster may be generated in accordance with the classification result. In this case, the generated representative vectors are stored in the storage device 13 separately from those generated by the representative vector generation unit 114.

The lookup table generation unit 116 stores, in the lookup table 14, the indices of the representative vectors and the indices of the clusters to which the representative vectors are allocated as the result of classification performed by the representative vector classification unit 115. The lookup table 14 stores the indices of the representative vectors and the indices of the clusters to which the representative vectors are classified.

(Arrangement of Classification Index Allocation Unit 12)

The detailed arrangement of the classification index allocation unit 12 will be described next. An image input unit 121 and a feature vector extraction unit 122 (second feature vector extraction unit) perform the same processes as those of the image input unit 111 and the feature vector extraction unit 112 of the classification table generation unit 11 except that the processing target is not a learning image but an identification target image.

An inter-vector distance calculation unit 123 receives all feature vectors extracted by the feature vector extraction unit 122 and the representative vector group generated by the representative vector generation unit 114 of the classification table generation unit 11, and calculates the distance between each feature vector and each representative vector. The inter-vector distance calculation unit 123 outputs a distance matrix. Note that the definition of the inter-vector distance corresponds to the inter-vector distance in the classification method used by the feature vector classification unit 113.

A representative vector allocation unit 124 allocates, to each feature vector, the index of the nearest representative vector of the feature vector based on the distance matrix obtained by the inter-vector distance calculation unit 123.

A classification index allocation unit 125 searches for the index of a cluster to which each representative vector is allocated as the result of classification performed by the representative vector classification unit 115 by looking up the lookup table 14 generated by the lookup table generation unit 116. The classification index allocation unit 125 then allocates, to each feature vector, the index of the cluster corresponding to the representative vector allocated to the feature vector.

An identification feature vector generation unit 126 outputs an identification feature vector to be supplied to the discriminator 15. In this embodiment, the appearance frequency of each cluster is calculated by referring to the indices of clusters allocated to all input vectors by the representative vector allocation unit 124, and a frequency histogram including the cluster indices as elements is generated as an identification feature vector. Note that when the representative vector classification unit 115 generates representative vectors, the identification feature vector may be output by replacing the input feature vectors with the representative vectors generated by the representative vector classification unit 115.

Figure 3:
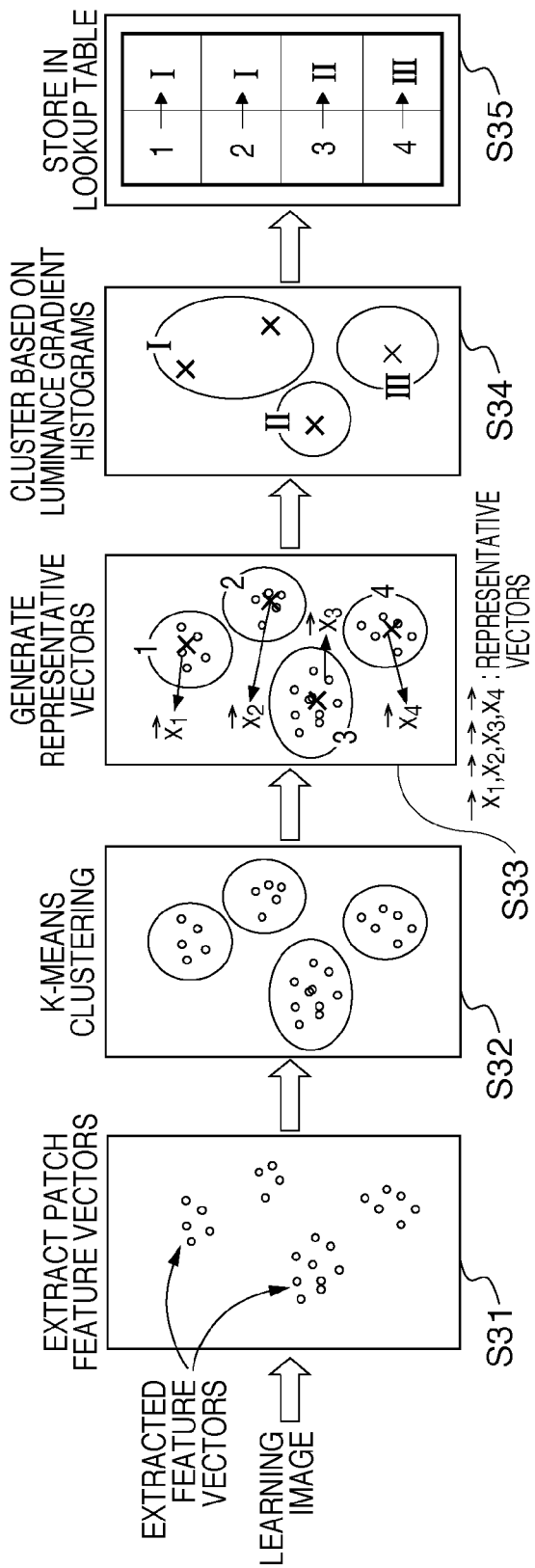
FIG. 3 is a view schematically showing the procedure of a classification table generation step according to the first embodiment.

The operation of the image processing apparatus will be described next with reference to FIGS. 2A and 2B. The operation of the image processing apparatus will be explained divisionally as a classification table generation step to be executed by the classification table generation unit 11 and a classification index allocation step to be executed by the classification index allocation unit 12. FIG. 3 schematically shows processing to be executed in the classification table generation step.

Referring to FIG. 2A, the classification table generation unit 11 accepts input of a learning target image group (learning image) from an external device in step S210, and extracts feature vectors from the input learning image in step S211. In this embodiment, a patch feature vector is used as the feature vector to be extracted in step S211. The patch feature vector is a feature vector having pixel values in a local region of the learning image as elements. In this embodiment, the local region expressed by the patch feature vector is a square region of 16×16 pixels. The patch feature vectors are obtained from the entire image while making the local regions overlap by eight pixels.

Patch feature vector extraction processing will be described with reference to FIG. 4. First in step S411, the learning image is input. In step S412, the size of the learning image is obtained. In step S413, the initial values of region coordinate parameters x and y to specify a local region included in the learning image are set to 1. Note that the x-axis length of the learning image is represented by img_length, and the y-axis length is represented by img_height. In step S414, a local region of 16×16 pixels having (x,y), (x+15,y), (x,y+15), and (x+15,y+15) as vertices is cut out from the learning image. In step S415, the pixel values (for example, luminance values) of all pixels in the local region are stored as a feature vector.

In step S416, the value of the region coordinate parameter y is incremented by eight. In step S417, the process branches in accordance with the updated value y. More specifically, if the y coordinate (y+15) of the lower edge of the local region is equal to or smaller than img_height, the process returns to step S414 to repeat the same processing. On the other hand, if the y coordinate (y+15) of the lower edge of the local region is larger than img_height, the process advances to step S418. In step S418, the value of the region coordinate parameter x is incremented by eight, and the value y is initialized to 1. In step S419, the process branches in accordance with the updated value x. If the x coordinate (x+15) of the right edge of the local region is equal to or smaller than img_length, the process returns to step S414 to repeat the same processing. If the x coordinate (x+15) of the right edge of the local region is larger than img_length, the processing ends. With the above-described processing, the patch feature vectors are obtained from the learning image.

Figure 5A:
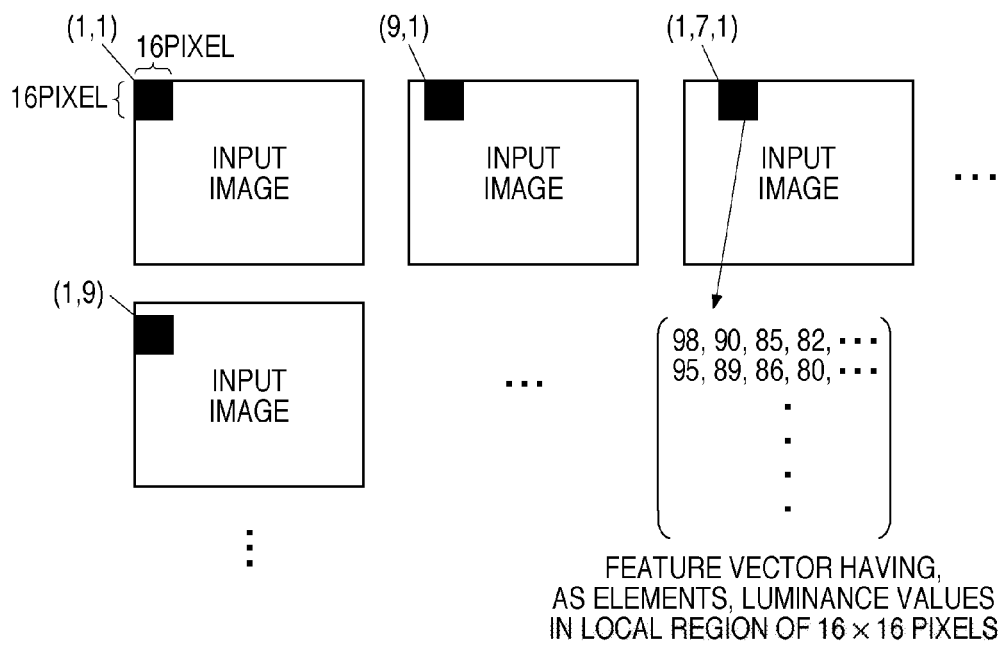
FIG. 5A is an explanatory view showing feature vector extraction processing according to the first embodiment.

FIG. 5A shows the processing of obtaining patch feature vectors from an input learning image (input image). The local region of 16×16 pixels is moved across the input learning image (input image) from the coordinates (1,1) to the end of the learning image (input image), thereby obtaining the patch feature vectors from the entire learning image (input image).

Referring back to FIG. 2A, in step S212, the feature vectors extracted in step S211 are clustered. In step S213, representative vectors are generated from the clusters generated in step S212, and the representative vector group is stored in the storage device 13. In this embodiment, clustering is performed using the k-means method to generate the representative vectors. The k-means method clusters the feature vectors so as to minimize the sum of the Euclidean distances between k representative vectors serving as the center of gravity of each cluster and the feature vectors included in the clusters.

Figure 5B:
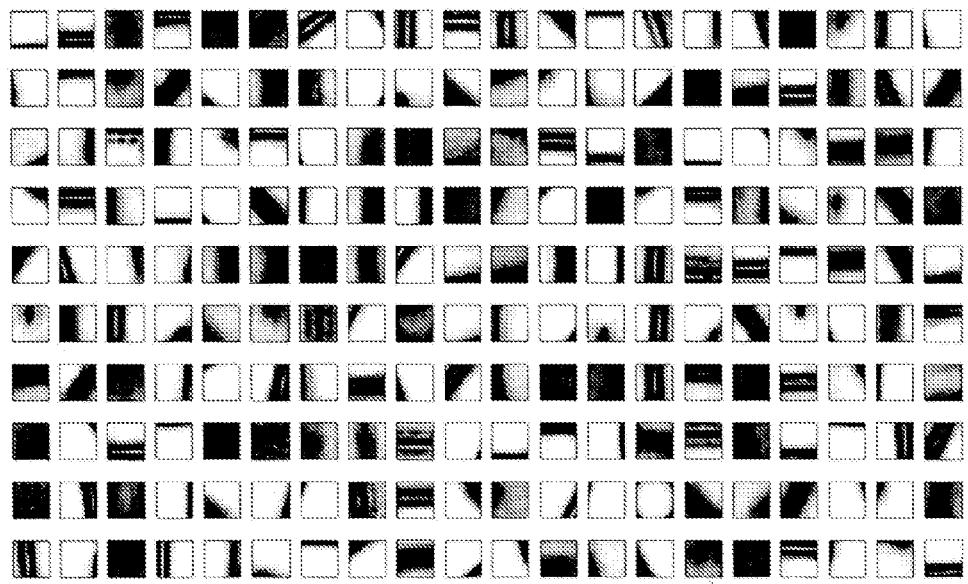
FIG. 5B is a view showing an example of generated representative vectors.

FIG. 5B shows an example of a representative vector group generated from the extracted patch feature vectors when the number of clusters is 200. Using the representative vectors shown in FIG. 5B allows to replace the arbitrary patch feature vectors extracted from the input learning image with 200 patterns. However, the representative vectors include vectors of similar shape. If a plurality of representative vectors of similar shape are generated, similar patch feature vectors are allocated to different representative vectors at a high possibility, resulting in poorer identification performance. To prevent this, the representative vectors obtained in step S213 are further clustered using a different method in the subsequent steps, thereby integrating representative vectors of similar shape.

In step S214, the representative vectors generated in step S213 are classified by a method different from that in step S212. An example of the patch feature vector classification method is clustering after correction processing such as filtering of pixel values or distance definition according to image features, or after manifold learning of the prior art. This embodiment adopts an example in which luminance gradient histograms are generated from the representative vectors, and classification is performed by the Ward method using the inter-histogram distance.

Figure 6A:
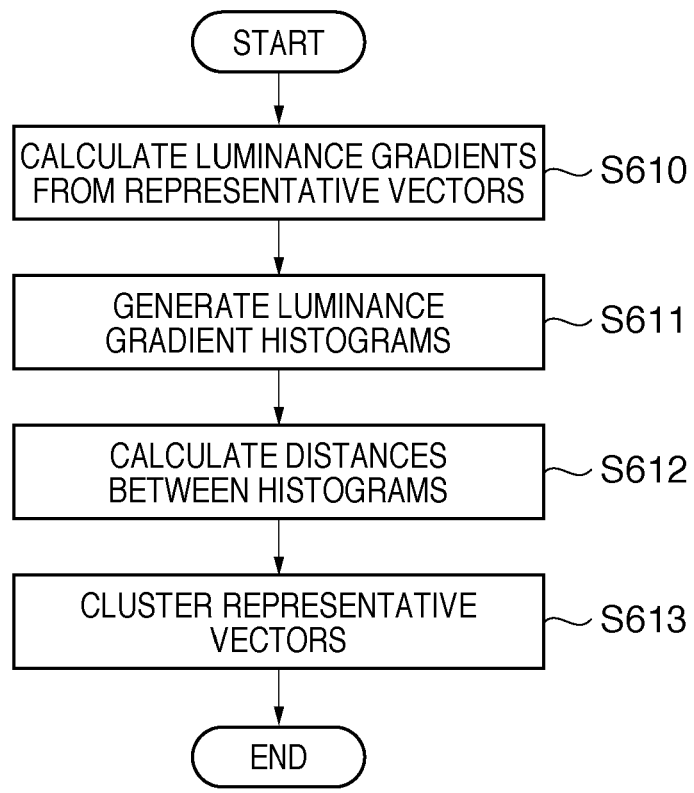
FIG. 6A is a flowchart for explaining the processing procedure of classification of second stage in the classification table generation step according to the first embodiment.
Figure 6B:
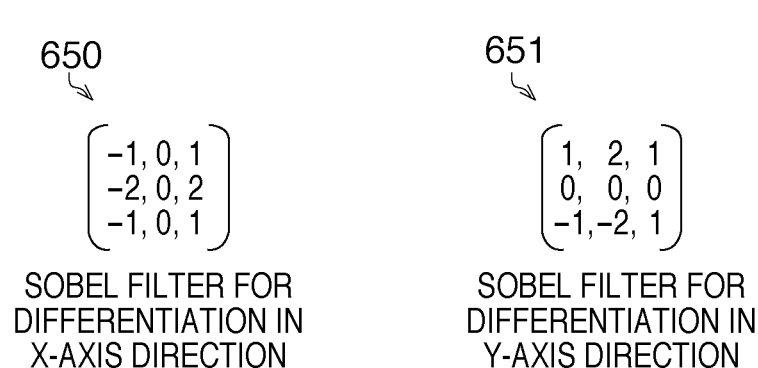
FIG. 6B is a view illustrating Sobel filters to be used to obtain the luminance gradient of representative vectors.

The procedure of classification in step S214 will be described in detail with reference to the flowchart of FIG. 6A. In step S610 of FIG. 6A, the luminance gradient of each pixel in the local region of 16×16 pixels represented by each representative vector is calculated. Sobel filters 650 and 651 in FIG. 6B are applied to the pixels to obtain the luminance gradient in the x-axis direction and that in the y-axis direction. The arc tangent of these luminance gradients is obtained to calculate the luminance gradient of each pixel. In step S611, the luminance gradients of the pixels calculated in step S610 are discretized to generate the luminance gradient histogram of each representative vector. In step S612, the distances between the luminance gradient histograms of the representative vectors are calculated and defined as the distances between the representative vectors. In this embodiment, the distance between histograms is defined by $X^2$ distance. An $X^2$ distance d is obtained by $$d(H_1, H_2) = \sum_I \left( \frac{(H_1(I) - H_1(I))^2}{H_1(I) - H_1(I)} \right)$$

where $H_1$ and $H_2$ are histograms, I is the bin of each histogram, and Hi(I) is the frequency of the Ith bin of a histogram Hi.

In step S613, regarding the distances between the histograms obtained in step S612 as the distances between the representative vectors, the representative vectors are clustered using the Ward method. The Ward method is a clustering method of obtaining a hierarchical similarity structure whose vertex represents a state wherein all representative vectors are put into one cluster and whose lowermost layer represents a state wherein the representative vectors are fragmented so as to make each cluster include only one target. However, an inter-cluster distance D is defined by $$D(C_1, C_2) = E(C_1 \cup C_2) - E(C_1) - E(C_2)$$

for $$E(C_i) = \sum_{x \in C_i} (D(x, C_i)^2)$$

where Ci is the ith cluster, and x is the representative vector of each cluster.

Figure 7A:
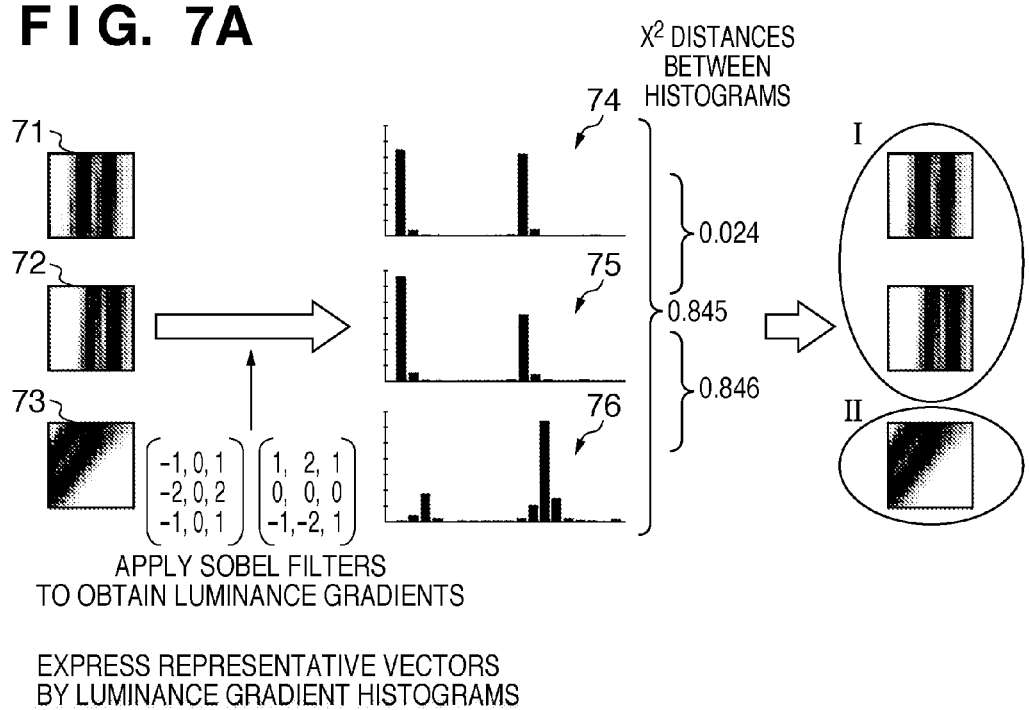
FIG. 7A is a view illustrating classification of second stage in the classification table generation step according to the first embodiment.

FIG. 7A schematically shows an example in which three representative vectors 71, 72, and 73 are extracted from the representative vectors shown in FIG. 5B and subjected to the process in step S214. Clustering by the Ward method is omitted, and only the result is illustrated. First, Sobel filters are applied to the representative vectors in FIG. 7A to obtain the luminance gradient of each pixel of the representative vectors, thereby expressing each representative vector as a luminance gradient distribution histogram. Histograms 74, 75, and 76 in FIG. 7A correspond to the representative vectors 71, 72, and 73, respectively. Next, the $X^2$ distances between the histograms are calculated. In the example of FIG. 7A, the $X^2$ distance between the histograms 74 and 75 is 0.024, that between the histograms 75 and 76 is 0.846, and that between the histograms 76 and 74 is 0.845. Finally, clustering is performed regarding these values as the distances between the representative vectors. As can be seen, the representative vectors 71 and 72 close in the distance are put into the same cluster.

Figure 7B:
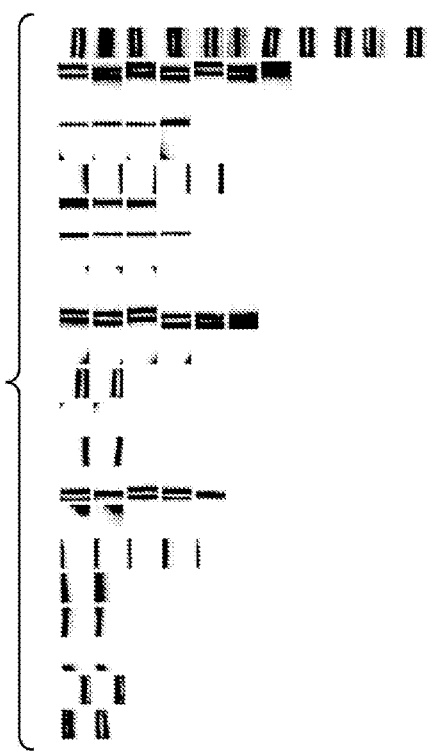
FIG. 7B is a view illustrating integrated representative vectors.

FIG. 7B is a view illustrating groups of representative vectors classified into single clusters by performing the process in step S613 for all representative vectors shown in FIG. 5B. As is apparent from FIG. 7B, representative vectors of similar shape can be put into one cluster. This allows to reduce the influence of the problem posed in the classification by the k-means method in step S212, that is, the problem that patch feature vectors of similar shape are allocated to different representative vectors.

In step S215 of FIG. 2A, the indices of the representative vectors and the indices of clusters to which the representative vectors are allocated as the result of classification performed in step S214 are stored in the lookup table 14.

Next, the processing procedure of the classification table generation step will be described again with reference to FIG. 3 that schematically shows the processing procedure. First, patch feature vectors are extracted from the input learning image. As shown in step S31, the extracted patch feature vectors are variously distributed on the feature space. In step S32, the patch feature vectors distributed on the feature space are classified into a plurality of clusters by the k-means method. In the example of FIG. 3, the feature vectors are classified into four clusters by k-means clustering. The clusters are indexed and called clusters 1, 2, 3, and 4. In step S33, representative vectors x1 to x4 of the clusters are generated. In step S34, second clustering is executed for not all the extracted feature vectors but only the representative vectors x1 to x4 of the clusters based on, for example, the distances between luminance gradient histograms. In the example of FIG. 3, the representative vectors x1 and x2 are classified into cluster I, the representative vector x3 is classified into cluster II, and the representative vector x4 is classified into cluster III. In step S35, the correspondence relation is stored in the lookup table. The lookup table stores that cluster I corresponds to indices 1 and 2. The lookup table also stores that cluster II corresponds to index 3, and cluster III corresponds to index 4.

Step S31 of FIG. 3 corresponds to step S211 of FIG. 2A. Steps S32, S33, S34, and S35 correspond to the processes in steps S212, S213, S214, and S215, respectively.

The operation of the classification index allocation step will be described next with reference to FIGS. 2B and 8, in which feature vectors to be supplied from an input image to the discriminator are output using index data generated in the classification table generation step.

In the classification index allocation step, input of an identification target image from an external device is accepted first in step S220 of FIG. 2B. In step S221, patch feature vectors are extracted from the input identification target image. The feature vector extraction method in step S221 is the same as that in step S211 of the classification table generation step.

In step S222, the distances between all representative vectors generated in step S213 of FIG. 2A and all patch feature vectors extracted in step S221 of FIG. 2B are calculated. Note that these inter-vector distances correspond to the inter-vector distances obtained by the k-means method in step S212 of FIG. 2A, and are defined by Euclidean distances in this embodiment.

In step S223, a representative vector closest in distance, that is, the nearest representative vector of each feature vector is detected using information (distance information) representing the distances between all patch feature vectors and all representative vectors calculated in step S222, and allocated to the feature vector. In step S224, the lookup table created in step S215 is searched for the index to specify the cluster to which a representative vector allocated to a feature vector is classified, and the index is allocated to the feature vector. With this operation, in step S224, only calculating the Euclidean distances between the vectors enables to virtually reflect the classification result representing integration of patches of similar shape in step S214.

In step S225, an identification feature vector (identification information) to be supplied to the discriminator is generated as an output based on the allocated indices. The identification feature vector to be output is obtained using a frequency histogram representing the appearance frequencies of indices allocated to all feature vectors.

The output identification feature vector is supplied to the discriminator such as a Support Vector Machine so as to perform identification, thereby implementing detection and recognition of the target object. The discriminator to be used here can be an arbitrary discriminator.

Next, the processing procedure of the classification index allocation step will be described again with reference to FIG. 8 that schematically shows the processing procedure. First, patch feature vectors are extracted from the input identification target image. As shown in step S801, the extracted patch feature vectors are variously distributed on the feature space, as in step S31 of FIG. 3. In step S802, the Euclidean distances between all patch feature vectors distributed on the feature space and all representative vectors generated in the classification table generation step are calculated. In step S803, the nearest representative vector is allocated to each feature vector. In the example of FIG. 8, the representative vectors x1, x2, and x4 closest in distance are allocated to three patch feature vectors 811, 812, and 813, respectively.

In step S804, the indices of clusters classified in step S214 are allocated to the representative vectors allocated to the feature vectors by looking up the lookup table created in the classification table generation step. In the example of FIG. 8, since the representative vectors x1 and x2 are classified into cluster I, and the representative vector x4 is classified into cluster III, I, I, and III are allocated to the patch feature vectors 811, 812, and 813, respectively. The indices are allocated to all feature vectors in the same way. Finally in step S805, the histogram of the appearance frequencies of the indices is created as an identification feature vector by using I, II, III, and IV as bins based on the result of allocation for all feature vectors.

In this embodiment, an example has been described in which second classification is done to integrate representative vectors of similar shape using the luminance gradient histograms of the representative vectors. However, the present invention is not limited to this. For example, as another embodiment, manifold learning may be performed for representative vectors using Isomap (J. B. Tenenbaum, V. de Silva, and J. C. Langford, "A global geometric framework for nonlinear dimensionality reduction", Science, 290:2319-2323, 2000.), and the result may be clustered by the k-means method. When manifold learning is performed in the second classification, robust classifications of feature vectors that vary due to external variable factors can be obtained in the classification index allocation step only by calculating the distances between the representative vectors and the feature vectors extracted from the identification target image.

(Second Embodiment)

In the first embodiment, processing of causing the classification table generation unit 11 to perform classification of second stage for representative vectors generated as the result of classification of first stage has been described. At this time, a single index is always allocated to all feature amounts classified into a cluster by the classification of first stage. In the second embodiment, however, processing of classifying two different feature vectors, which are classified into a single cluster by classification of first stage, into different clusters by classification of second stage will be described.

Figure 1B:
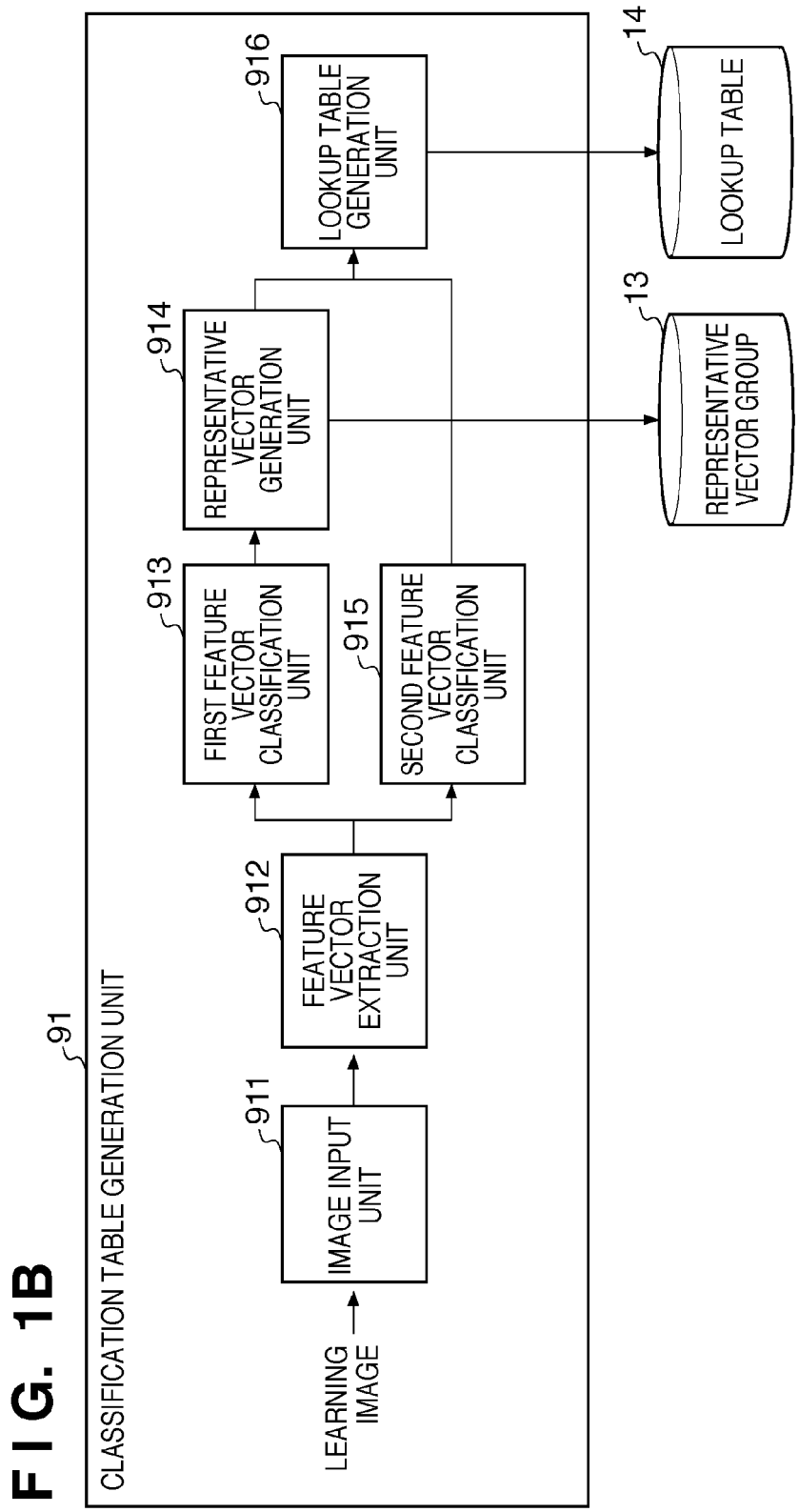
FIG. 1B is a block diagram showing an example of the arrangement of the classification table generation unit of an image processing apparatus according to the second embodiment.

FIG. 1B is a block diagram showing the arrangement of a classification table generation unit 91 of an image processing apparatus according to the embodiment. Note that the arrangement of a classification index allocation unit 12 is the same as that of the first embodiment, and a description thereof will not be repeated. Referring to FIG. 1B, an image input unit 911 of the classification table generation unit 91 accepts input of a learning image.

A feature vector extraction unit 912 extracts feature vectors from the input learning image. A first feature vector classification unit 913 classifies the extracted feature vectors into a plurality of clusters. A representative vector generation unit 914 generates a representative vector for each of the classified clusters and stores the representative vectors. A second feature vector classification unit 915 classifies the extracted feature vectors by a classification method different from that used by the first feature vector classification unit 913. A lookup table generation unit 916 allocates the classified feature vectors to the representative vectors in accordance with the distribution of the clusters classified by the second feature vector classification unit 915, and generates a lookup table that stores the correspondence relations.

The image input unit 911, feature vector extraction unit 912, first feature vector classification unit 913, and representative vector generation unit 914 perform the same processes as those of the image input unit 111, feature vector extraction unit 112, feature vector classification unit 113, and representative vector generation unit 114 in FIG. 1A.

The second feature vector classification unit 915 classifies all the extracted feature vectors into a plurality of clusters by a method different from that of the first feature vector classification unit 913. This classification is done using a high-performance classification method that reflects the characteristic of an image, like the representative vector classification unit 115 in FIG. 1A. When all feature vectors are classified here, the time required for processing in the classification table generation unit becomes longer than in the first embodiment. However, this also makes it possible to cope with a situation in which two different feature vectors, which are classified into a single cluster by the classification of first stage, are classified into different clusters by the classification of second stage.

The lookup table generation unit 916 determines, based on the classification result of the first feature vector classification unit 913 and that of the second feature vector classification unit 915, the allocation destination of each representative vector generated by the representative vector generation unit 914. The lookup table generation unit 916 stores the allocation destination in the lookup table. At this time, there may exist a plurality of representative vector allocation destinations. The allocation method can be an arbitrary method.

For example, (i) it is checked which one of the clusters classified by the second feature vector classification unit 915 includes a feature vector included in a cluster classified by the first feature vector classification unit 913, and a representative vector is allocated to the cluster including the largest number of feature vectors.

Alternatively, (ii), it is checked which one of the clusters classified by the second feature vector classification unit 915 includes a feature vector included in a cluster classified by the first feature vector classification unit 913. A weight is added in accordance with the distribution ratio, and a representative vector is allocated to each cluster. The detailed operation will be described later. The lookup table stores the indices of the representative vectors and the indices of the clusters to which the representative vectors are allocated.

Figure 9A:
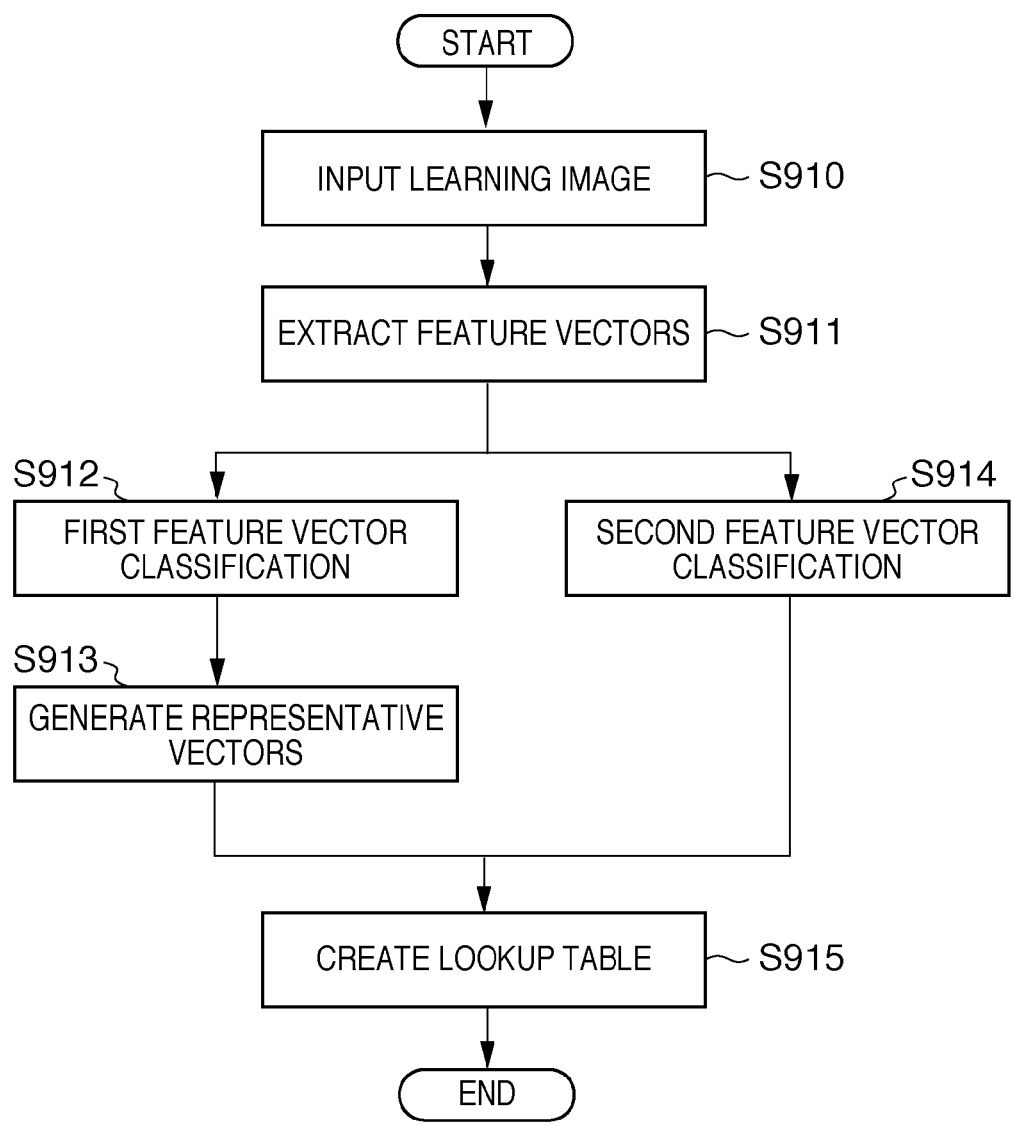
FIG. 9A is a flowchart for explaining the processing procedure of a classification table generation step.

The outline of the overall operation of the classification table generation step according to the embodiment will be explained with reference to FIG. 9A. Processing in steps S910 to S913 is the same as in the classification table generation step (FIG. 2A) of the first embodiment, and a description thereof will not be repeated. In step S914, feature vectors extracted in step S911 are classified by a method different from that in step S912. The classification method used here is a high-performance classification method that reflects the characteristic of an image as compared to the classification method in step S912, like the representative vector classification unit 115 of the first embodiment.

In step S915, a lookup table that stores the representative vector allocation destinations is generated using the classification result in step S912 and that in step S914. In this embodiment, the allocation method (ii) is used. The processing procedure of step S915 will schematically be described next with reference to FIG. 9B. First in step S921, feature vectors are extracted from a learning image. The extracted feature vectors are classified using different methods in steps S922 and S923. In step S922, the feature vectors are classified into clusters 1, 2, 3, and 4, and representative vectors x1, x2, x3, and x4 are generated for the clusters, respectively. On the other hand, in step S923, the feature vectors are classified into clusters A, B, C, and D. In the first embodiment, the second classification method is performed for the representative vectors x1, x2, x3, and x4. Hence, the method of the second embodiment is expected to raise the accuracy of second classification as compared to the first embodiment. In step S924, the first classification result and the second classification result are displayed in a superimposed manner. For example, five feature vectors are classified into the cluster 1. Of the five feature vectors, three feature vectors belong to the cluster A, and two feature vectors belong to the cluster B. In this case, in accordance with the distribution of the feature vectors belonging to the cluster 1 on the clusters classified as the result of second classification, 0.6 is allocated to the cluster A, and 0.4 is allocated to the cluster B for the representative vectors of cluster 1 based on the ratio of distribution of representative vectors (S925). The same operation is performed for all representative vectors, thereby determining allocation to each cluster.

In the classification index allocation step, feature vectors extracted from an input identification target image are allocated to nearest representative vectors, and a second classification result is allocated to each feature vector by looking up a created lookup table. In this embodiment, since the real numbers of a plurality of clusters are allocated to each representative vector on the lookup table, a plurality of indices are allocated to each feature vector as real numbers. Hence, when a frequency histogram representing the appearance frequencies of the indices in all feature vectors is used as an identification feature vector, as in the first embodiment, the value of each bin of the histogram is expressed by a real number.

In the processing of the first embodiment, second classification is performed using the first classification result, thereby determining allocation destinations. In the second embodiment, however, allocation is done complexly using the first classification result and the second classification result. When second classification is performed based on representative vectors generated from the first classification result, data can be reduced, and second classification can therefore be performed at a high speed. On the other hand, when a feature vector is classified into different clusters by the first and second classifications, second classification based on the representative vectors may make it impossible to obtain an accurate classification result. Using the method of this embodiment can reduce such degradation in classification accuracy.

(Third Embodiment)

The first embodiment aims at determining the presence/absence of a target object in an arbitrary input image. The third embodiment aims at determining, using two different types of target objects, which target object exists in an input image. In this case, when identifying the target object, an important element is not the shape difference between feature vectors but which one of the two different types of target objects is the target object in which a feature vector appears. In this embodiment, an example will be described in which second classification is performed based on the identification usability of feature vectors.

In this embodiment, 2-class identification of objects A and B will be examined. The operation of each process of the classification table generation step according to the embodiment will be described with reference to FIG. 10A. In step S1010 of FIG. 10A, input of a learning target image is accepted from an external device. At this time, the input learning image has an object flag explicitly representing the type A or B of identification target object.

In step S1011, feature vectors are extracted from the input learning image, as in the first embodiment. All feature vectors extracted from each input learning images have the object flag added to the learning image.

In step S1012, the feature vectors extracted in step S1011 are classified, as in the first embodiment. In step S1013, representative vectors are generated. This classification is done without considering the object flag added to the feature vectors.

In step S1014, the object flags of feature vectors included in the clusters generated in step S1012 are checked, and a ratio R of the object flags of all feature vectors included in each cluster is recorded. Let ai be the total number of object flags of object A included in a cluster i, and bi be the total number of object flags of object B. R of the cluster i is given by $$R_i = \frac{a_i - b_i}{a_i + b_i}$$

The value R indicates the identification usability of the representative vector. As the value R become closer to 1, the representative vector often appears only in the object A. As the value R become closer to −1, the representative vector often appears only in the object B. As the value R become closer to 0, the representative vector is of less importance in identifying the objects A and B.

In step S1015, expressing the distances between the representative vectors as the differences in R, clustering is performed using the Ward method. In step S1016, the representative vector allocation destinations are stored in a lookup table 14 based on the classification result in step S1015, as in the first embodiment. Index allocation processing is the same as that of the first embodiment, and a description thereof will not be repeated.

In this embodiment, second classification in the classification table generation step is performed based on the identification usability of representative vectors generated from the first classification result. According to this method, it is possible to perform identification based on not the shapes of extracted feature vectors but the identification usability of the feature vectors only by calculating the distances between the extracted feature vectors and the representative vectors.

(Fourth Embodiment)

In the fourth embodiment, determining, using two different types of target objects, which target object exists in an input learning image will be examined, as in the third embodiment. When identifying a learning image including an arbitrary object, a generated representative vector needs to have a feature common to general images. If the learning image is limited to some extent, as in this embodiment, it is necessary to perform learning classification to identify only given data and generate appropriate representative vectors. In this embodiment, an example will be described in which second learning classification is performed using a discriminator to determine representative vector allocation destinations.

The processing procedure of the classification table generation step according to the embodiment will be described with reference to FIG. 10B. In step S1020, input of a learning image is accepted from an external device. In step S1021, some images are selected at random from the learning image group. The selected image group is used as test images for learning classification using a discriminator in step S1025, and not concerned in processing of steps S1022 to S1024.

The processing of steps S1022 to S1024 is the same as that of the third embodiment, and a description thereof will not be repeated. However, the process target image is not the entire learning image but an image group except the images selected in step S1021.

In step S1025, repetitive learning using a discriminator is performed for representative vectors created in step S1024 so as to classify the representative vectors suitable for identification of input data. Since the classification result depends on the type of discriminator, the discriminator used here is the same as that used in identification of succeeding stage. In this embodiment, an SVM (Support Vector Machine) is used.

Figure 11:
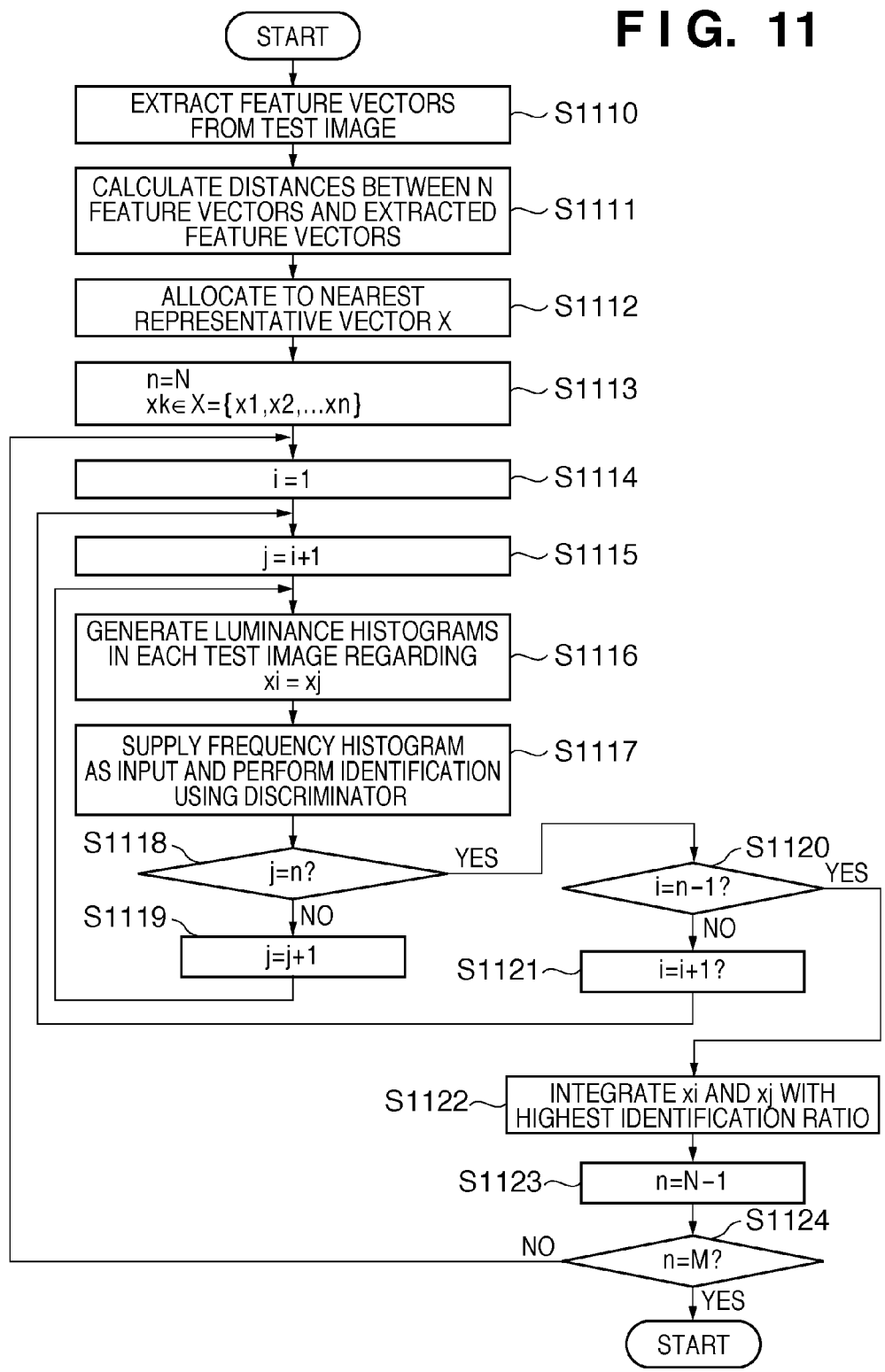
FIG. 11 is a flowchart for explaining the processing procedure of classification of second stage in the classification table generation step of the image processing apparatus according to the fourth embodiment.

The processing in step S1025 will be described with reference to the flowchart of FIG. 11. Step S1025 aims at classifying N representative vectors into M clusters (N>M>1). A state in which N representative vectors are classified into N clusters will be considered as the initial state. The indices of the representative vectors and the indices of the classified clusters are stored in a lookup table 14. In the initial state, the index number of a representative vector equals the index number of its classification destination. First in step S1110 of FIG. 11, feature vectors are extracted, using the same method as in step S1022, from the test image group selected in step S1021. In step S1111, the distances between the extracted feature vectors and the representative vectors created in step S1024 are calculated. In step S1112, each feature vector is allocated to a representative vector with the shortest inter-vector distance. Processing up to this point is the same as that of the classification table generation unit 11. Subsequently in steps S1113 to S1115, the number of representative vectors is set to N, the representative vectors are set to xk (k=1 to N) by initial parameter setting, and n=N, i=1, and j=i+1 are substituted into repetitive parameters n, i, and j, respectively.

In step S1116, representative vectors xj and xi are allocated to the same cluster to decrease the total number of clusters to n−1. As in the processing of the classification index allocation step of the first embodiment, the indices of representative vector allocation destination clusters are allocated to feature vectors allocated to the representative vectors, and the histogram of the appearance frequencies of the clusters is generated for each test image.

In step S1117, the frequency histogram is supplied to the SVM (Support Vector Machine) as an input so as to identify all test images, and the identification ratio is stored. The frequency histogram creation processing (S1116) and the identification processing using the discriminator (S1117) are performed for all combinations of representative vectors, thereby calculating the identification ratio.

In step S1118, the representative vectors of the representative vector combination whose identification ratio is the highest are classified into a single cluster. At this time, the index numbers of corresponding representative vector classification destination clusters in the lookup table are updated. The processing of steps S1114 to S1123 are executed repeatedly until n=M, that is, the number of clusters becomes M.

When the above-described processing is executed, it is possible to perform learning classification of the representative vectors created in step S1024 using the discriminator and thus classify the representative vectors suitable for identification of input data. Processing of the classification index allocation step is the same as that of the first embodiment, in which based on the created lookup table, indices are allocated to the feature vectors extracted from the input learning image.

According to the embodiment, in the second classification of the classification table generation step, learning classification of representative vectors is performed by repetitive classification using the discriminator. Calculating, by the above-described method, the distances between feature vectors extracted from the input image and representative vectors created in advance allows to reflect a feature vector classification result suitable for identifying a specific target object.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-293205, filed Dec. 24, 2009, which is hereby incorporated by reference herein in its entirety.

What is claimed is:

1. An image processing apparatus, comprising:
 a feature vector extraction unit configured to extract feature vectors from a learning image;
 a first feature vector classification unit configured to classify the feature vectors extracted by said feature vector extraction unit into a first cluster based on a first classification method;
 a representative vector generation unit configured to generate representative vectors of the feature vectors included in the first cluster classified by said first feature vector classification unit;
 a representative vector classification unit configured to classify the representative vectors generated by said representative vector generation unit into a second cluster which is different from the first cluster based on a second classification method which is different from the first classification method;
 an association unit configured to associate the representative vectors with the second cluster; and
 a storing unit configured to store a result associated by said association unit as a lookup table.

2. The apparatus according to claim 1, wherein an element of the extracted feature vectors is a pixel value of the learning image.

3. The apparatus according to claim 1, wherein the first classification method is executed based on distances between the extracted feature vectors.

4. The apparatus according to claim 1, wherein the representative vector classification unit classifies the representative vectors having a similar shape into the second cluster based on distances between luminance gradient histograms of the representative vectors.

5. An image processing method executed in an image processing apparatus, the method comprising:
 a feature vector extraction step of extracting feature vectors from a learning image;
 a first feature vector classification step of classifying the feature vectors extracted in the feature vector extraction step into a first cluster based on a first classification method;
 a representative vector generation step of generating representative vectors of the feature vectors included in the first cluster classified in the first feature vector classification step;
 a representative vector classification step of classifying the representative vectors generated in the representative vector generation step into a second cluster which is different from the first cluster based on a second classification method which is different from the first classification method;
 an association step of associating the representative vectors with the second cluster; and
 a storing step of storing in a storage unit, as a lookup table, a result associated in the association step.

6. A non-transitory computer-readable storage medium storing a computer program which makes a computer execute an image processing method according to claim 5.

7. An image processing apparatus, comprising:
 a feature vector extraction unit configured to extract feature vectors from a learning image;
 a first feature vector classification unit configured to classify the feature vectors extracted by said feature vector extraction unit into a first cluster based on a first classification method;
 a second feature vector classification unit configured to classify the feature vectors extracted by said feature vector extraction unit into a second cluster which is different from the first cluster based on a second classification method which is different from the first classification method;
 a determination unit configured to determine the feature vectors in the first cluster which are included in any one of second clusters based on a distribution of first clusters and the second clusters;
 an association unit configured to associate the first cluster with the second cluster, based on a result of the determination unit; and
 a storing unit configured to store a result associated by said association unit, as a lookup table.

8. The apparatus according to claim 7, wherein an element of the extracted feature vectors is a pixel value of the learning image.

9. The apparatus according to claim 7, wherein the first classification method is executed based on distances between the extracted feature vectors.

10. The apparatus according to claim 7, wherein the representative vector classification unit classifies the representative vectors having a similar shape into the second cluster based on distances between luminance gradient histograms of the representative vectors.

11. The apparatus according to claim 7 further comprising:
 a representative vector generation unit configured to generate representative vectors of the feature vectors included in the first cluster classified by said first feature vector classification unit,
 wherein the determination unit determines a representative vector included in any one of the second clusters based on the distribution of the first clusters and the second clusters.

12. An image processing method executed in an image processing apparatus, the method comprising:
 a feature vector extraction step of extracting feature vectors from a learning image;

a first feature vector classification step of classifying the feature vectors extracted in the feature vector extraction step into a first cluster based on a first classification method;

a second feature vector classification step of classifying the feature vectors extracted in the feature vector extraction step into a second cluster which is different from the first cluster based on a second classification method which is different from the first classification method;

a determination step of determining the feature vectors in the first cluster which are included in any one of second clusters based on a distribution of the first clusters and the second clusters;

an association step of associating the first cluster with the second cluster, based on a result of the determination step; and a storing step of storing in a storage unit, as a lookup table, a result associated in the association step.

13. A non-transitory computer-readable storage medium storing a computer program which makes a computer execute an image processing method according to claim 12.

14. The method according to claim 12 further comprising:

a representative vector generation step of generating representative vectors of the feature vectors included in the first cluster classified by said first feature vector classification step, wherein the determination step determines a representative vector included in any one of the second clusters based on the distribution of the first clusters and the second clusters.

* * * * *